Oct. 10, 1950     L. G. SMITH     2,524,936
YARN TESTING DEVICE
Filed Aug. 2, 1944
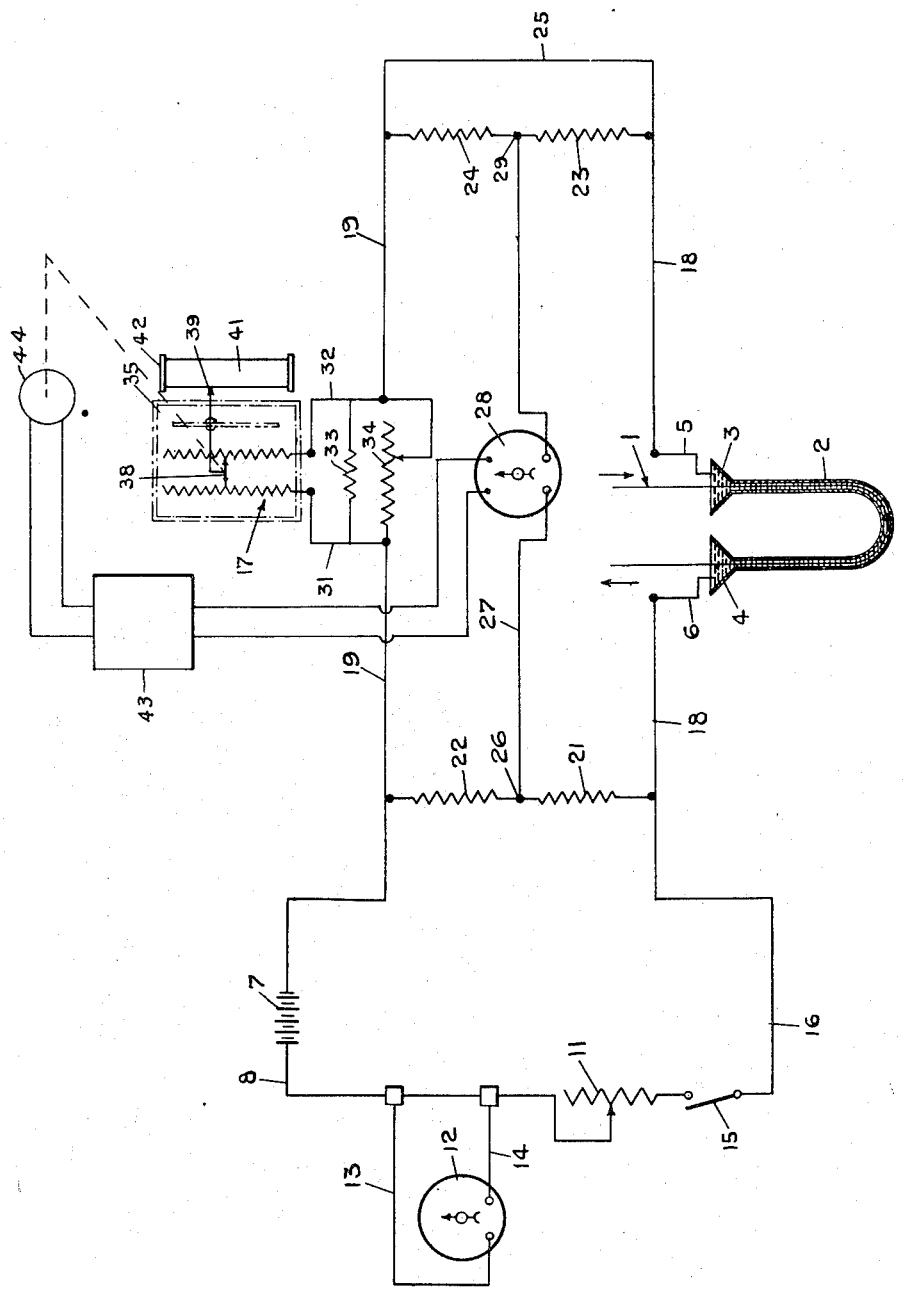
INVENTOR.
LELAND G. SMITH.
BY
ATTORNEYS.

Patented Oct. 10, 1950

2,524,936

UNITED STATES PATENT OFFICE 2,524,936

YARN TESTING DEVICE

Leland Gerald Smith, Narrows, Va., assignor to Celanese Corporation of America, a corporation of Delaware Application August 2, 1944, Serial No. 547,728

1 Claim. (Cl. 73—160)

This invention relates to a yarn testing device and relates more particularly to a device for measuring inferentially and recording the measurements of the denier of a yarn continuously along its length.

In the manufacture of yarns and especially synthetic continuous filament yarns such as those made of cellulose derivatives, regenerated cellulose and linear polyamide condensation products, it is highly desirable to check continuously the regularity of the yarn in order to adjust the production machines thus insuring perfectly uniform products. In the past it was necessary, in order to determine the periodical variations of denier of a yarn, to cut the yarn into lengths and weighing the segments. This method was time consuming, not sufficiently accurate and, moreover, necessitated the destruction of a certain amount of yarn. It is, accordingly, an important object of this invention to provide a yarn denier testing device that records the denier of a traveling yarn as said yarn passes a point, without the necessity of destroying the yarn.

Another object of this invention is the provision of a yarn denier testing device having an auotomatic balancing feature that gives instant readings without lag due to the necessity of manually balancing the testing device.

Other objects of the invention will appear from the following detailed description and drawing.

In accordance with my invention, I construct a device which both measures and records the denier of a yarn as it travels past or through the device without cutting or otherwise destroying the yarn. This device is so constructed that the electrical resistance of a column of mercury is measured as the traveling yarn changes the quantity of mercury between the electrodes in proportion to the change in denier of the yarn. This device is extremely sensitive and may be employed in measuring less than half a denier change in yarn having average deniers from 50 to 1000. Furthermore, the device may be employed in measuring the denier variations in yarns of any degree of twist from no twist to and including yarns of high twist.

For a more complete understanding of this invention, reference is had to the drawing wherein the figure is an electrical diagram of the circuits employed.

The reference numeral 1 indicates the yarn to be measured which is led from a bobbin or other source (not shown) through a tube 2 which is U-shaped, the two branches thereof terminating in funnels 3 and 4. The tube and funnels are preferably made of heavy wall glass but may be made of any suitable nonconductor of electricity that is not affected by mercury or other liquid conductor which may be employed. For the purpose of increasing the sensitivity of the instrument, the size of the tube is as small as practical yet with sufficient clearance that weaver's knots, etc. that may be in the yarn will not act to pump the fluid in the tube into funnel 4. The funnels 3 and 4 form reservoirs of mercury into which contacts 5 and 6 are dipped and also provide enough static pressure to minimize if not eliminate inclusion of air between fils of multifil yarn. The yarn is pulled from the source of supply, passed through the tube 2 and finally wound on a reel (not shown). The reel may be driven by motor and is preferably equipped with a revolution counter to furnish an indication of the length of yarn inspected, none of which is shown since any standard winding apparatus may be employed. The testing device may be mounted in a suitable cabinet or portable case (not shown).

The testing device is provided with an electrical circuit for measuring the difference in resistance of the mercury in the tube 2 as the volume of mercury is changed by any change in the denier of the yarn 1 passing through the tube. The electrical circuit consists of a power circuit and a resistance measuring bridge. The power circuit is provided with a source of electrical current such as a six-volt storage battery 7 or, if desired, a generator or transformer when electrical energy is to be obtained from sources outside the device. A lead 8 from one pole of the battery 7 is connected with a terminal of a variable resistance 11, a galvanometer 12 being connected in parallel with the lead 8, between said terminal and said resistance 11, by auxiliary wires 13 and 14 for the purpose of checking the battery current and govern the setting of the resistance 11. When employing a six-volt current, the resistance 11 should preferably be variable up to 60 ohms. A switch 15 is provided in a connecting wire 16 that connects the resistance 11 with the bridge circuit hereinafter described. By means of this power circuit a definite potential may be impressed across the bridge circuit.

The bridge circuit measures the difference in low resistance of the mercury in tube 2 and self-balancing slide wire resistance generally indicated by the reference numeral 17. The bridge circuit is provided with two arms 18 and 19. In the arm 18 is located the mercury tube 2 while in the arm 19 is located the slide wire resistance 17. The arms 18 and 19 are connected to each other through identical main resistances 21 and 22 on the power side of tube 2 and the slide wire 17. On the other side of the tube 2 and slide wire 17 they are connected by similar auxiliary identical resistances 23 and 24. The arms 18 and 19 are also connected with a low resistance conductor 25 in parallel with the resistances 23 and 24. It is preferable that the resistances of 21, 22, 23 and 24 and their connecting wires be equal thus eliminating the necessity of manually balancing the set with respect thereto. A terminal 26 between the main resistances 21 and 22 is connected by a lead 27 through a galvanometer or detector 28 to a terminal 29 located between the auxiliary resistances 23 and 24. Obviously, if the resistance in tube 2 and slide wire 17 are equal no current flows through the lead 27 and the detecting device 28 is at rest. However, if the resistance in the tube 2 is greater or less than the resistance in the slide wire 17 a current proportional to the difference in the resistances and in a direction dependent thereon will flow through the lead 27.

In operation, the set must be brought to as near a balance as possible, which balance is, of course, governed by the average denier of the yarn to be tested. To this end there is interposed between the slide wire 17 and the arm 19 of the bridge an auxiliary circuit consisting of leads 31 and 32 connecting the slide wire with the arm 19. Between the leads 31 and 32 and in parallel with the slide wire 17 are provided a fixed resistance 33 and a variable resistance 34 by means of which a resistance substantially equal to the resistance through tube 2 containing any given yarn denier may be obtained.

The galvanometer or detector 28 represents the sensitive element of any suitable self-balancing device generally indicated by reference numeral 38. The self-balancing mechanism may be of any standard type. One such self-balancing device, a potentiometer which can be adapted to this purpose, uses vacuum tubes, but they are not essentially a part of the measuring circuit. Their only purpose is to keep the measuring bridge circuit balanced by positioning the slide wires 17 continuously instead of intermittently as in mechanical devices. In operation, any unbalance in the measuring circuit as measured by the detector 28 causes direct current supplied by battery 7 to flow to said potentiometer wherein an oscillating reed converts the direct current to 60-cycle alternating current, and feeds said alternating current to a voltage-amplifying unit 43. This amplification is for the purpose of providing sufficient power to operate a slide wire positioning motor 44. The amplification is not a prerequisite for measuring the bridge unbalance. The slide wire contact element 38 may be provided with a pointer 39, which pointer may cooperate with a rotating chart 41 that is mounted on a cylinder 42 which may be driven by a suitable motor or clock mechanism. In this manner, the variations in denier of the yarn may be recorded as the yarn passes through tube 2.

It is to be understood that the foregoing detailed description is given merely by way of illustration and that many variations may be made therein without departing from the spirit of my invention.

Having described my invention, what I desire to secure by Letters Patent is:

A device for continuously testing or measuring the denier of a traveling yarn, comprising a U-tube terminating in funnels through which the yarn to be tested is adapted to be drawn, mercury in said U-tube and filling said funnels, contacts dipping into the mercury in said funnels, and a low resistance measuring bridge having said mercury as a resistance in one arm thereof and connected to said mercury through said contacts for measuring variations in the resistance of the mercury in said U-tube.

LELAND GERALD SMITH.

REFERENCES CITED

The following references are of record in the file of this patent:

UNITED STATES PATENTS

| Number | Name | Date |
|---|---|---|
| 1,683,833 | Maneschi | Sept. 11, 1928 |
| 1,960,350 | Schackleton | May 29, 1934 |
| 1,961,965 | Fisher | June 5, 1934 |
| 2,014,998 | Baguley | Sept. 17, 1935 |
| 2,045,970 | Stein | June 30, 1936 |
| 2,199,396 | Dubilier | May 9, 1940 |

FOREIGN PATENTS

| Number | Country | Date |
|---|---|---|
| 298,072 | Italy | Apr. 1931 |

OTHER REFERENCES

German publication, "Die Kunsteide," Aug. 1931, 13 Jahrgang, No. 8, Berlin.